(No Model.)

W. J. MILLER.
COMBINED THIMBLE AND THREAD CUTTER.

No. 273,380. Patented Mar. 6, 1883.

Witnesses,
Geo. H. Strong.
L. H. Krouse.

Inventor
W. J. Miller
By Dewey & Co.
Attorneys

UNITED STATES PATENT OFFICE.

WASHINGTON J. MILLER, OF ALAMEDA, CALIFORNIA.

COMBINED THIMBLE AND THREAD-CUTTER.

SPECIFICATION forming part of Letters Patent No. 273,380, dated March 6, 1883.

Application filed July 25, 1882. (No model.)

*To all whom it may concern:*

Be it known that I, WASHINGTON J. MILLER, of the city and county of Alameda, State of California, have invented an Improved Thimble and Thread-Cutter; and I hereby declare the following to be a full, clear, and exact description thereof.

My invention relates to an improvement in a combined thimble and thread-cutter; and it consists mainly in the peculiar means by which the knife is secured to the thimble, so that it may be reversed and used as a seam-ripper, and also in a channeled plate which is fixed to the side of the thimble, so that the edge of the knife is within the channel and below the level of its sides.

Figure 1:
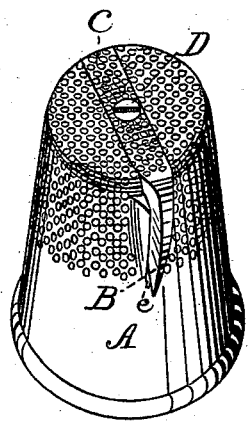
Figure 2:
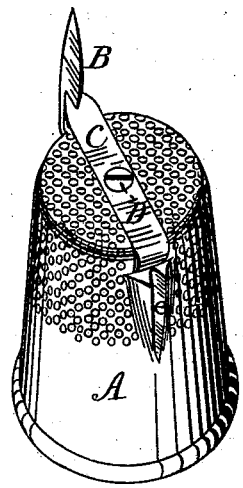

Referring to the accompanying drawings for a more complete explanation of my invention, Figure 1 is a view of the thimble with the knife attached, so as to serve as a thread-cutter. Fig. 2 shows the knife reversed.

A is a thimble, and B is the knife, which is attached to the thimble. In order to make this attachment so that the knife can be removed to be sharpened or reversed, it is provided with an extension, C, nearly at right angles with the blade, and square, so as to fit into a corresponding groove which is made across the top or closed end of the thimble. When fitted into this groove it is secured by a screw, D, which holds it firmly in place. The outside of the arm C is made rough, or with indentations, like the remainder of the thimble, so that the needle will not slip from it. The edge of the knife-blade stands at a short distance from the side of the thimble.

A block or lug having a groove or channel, e, formed in its center, is fixed to the side of the thimble, beneath the knife, so that the sides of the groove stand up on each side of the blade above its edge. When the thread is brought against the point of the knife and drawn across its edge the portion upon each side of the blade is lifted up by the sides of the grooved lug, and this causes such a tension upon that part of the thread which is across the blade that it is easily severed.

When it is desired to use the knife to rip seams, or for any other similar work, the screw D is removed and the knife reversed, so as to project away from the thimble, as shown in Fig. 2. The screw is then put into place again and holds the knife securely in its new position. The knife is thus removable for sharpening, and reversible for other uses.

Having thus described my invention, what I claim as new, and desire to secure by Letters Patent, is—

1. The thimble A, having a groove made transversely across its top, in combination with the knife B, with the extension or tang C, fitting said groove, and secured so as to extend down the side of the thimble, substantially as and for the purpose herein described.

2. In combination with the thimble A and the reversible knife B, as shown, the lug or block having a groove or channel, e, between the sides of which the edge of the knife stands, substantially as herein described.

In witness whereof I hereunto set my hand.

WASHINGTON J. MILLER.

Witnesses:
HOWARD H. SHINN,
J. FRANK MILLER.